(12) United States Patent
Munro et al.

(10) Patent No.: US 11,334,855 B2
(45) Date of Patent: May 17, 2022

(54) METHOD OF TRACKING REPAIR REQUESTS IN THE UNIFORM RENTAL INDUSTRY

(71) Applicants: Jefferson Russell Munro, Sour Lake, TX (US); Charles Edward Cearley, II, Lumberton, TX (US)

(72) Inventors: Jefferson Russell Munro, Sour Lake, TX (US); Charles Edward Cearley, II, Lumberton, TX (US)

( * ) Notice: Subject to any disclaimer, the term of this patent is extended or adjusted under 35 U.S.C. 154(b) by 142 days.

(21) Appl. No.: 16/741,327

(22) Filed: Jan. 13, 2020

(65) Prior Publication Data

US 2020/0226557 A1    Jul. 16, 2020

Related U.S. Application Data

(60) Provisional application No. 62/791,275, filed on Jan. 11, 2019.

(51) Int. Cl.
| | | |
|---|---|---|
| *G06Q 10/10* | (2012.01) | |
| *G06Q 10/00* | (2012.01) | |
| *G06K 19/06* | (2006.01) | |
| *G06Q 30/06* | (2012.01) | |
| *G06K 7/14* | (2006.01) | |
| *G06K 19/07* | (2006.01) | |

(52) U.S. Cl.
CPC ........... *G06Q 10/20* (2013.01); *G06K 7/1417* (2013.01); *G06K 19/06028* (2013.01); *G06K 19/06037* (2013.01); *G06K 19/0723* (2013.01); *G06Q 30/0645* (2013.01)

(58) Field of Classification Search
CPC ................. G06Q 10/20; G06K 7/1417; G06K 19/06028; G06K 19/06037
USPC ....................................................... 705/305
See application file for complete search history.

(56) References Cited

U.S. PATENT DOCUMENTS

| | | | |
|---|---|---|---|
| 4,598,376 A | 7/1986 | Burton et al. | |
| 5,072,822 A | 12/1991 | Smith | |
| 6,151,531 A | 11/2000 | Frankel et al. | |
| 6,882,897 B1* | 4/2005 | Fernandez | A41H 3/007 700/132 |
| 7,195,165 B2 | 3/2007 | Kesler et al. | |
| 7,388,489 B2 | 6/2008 | Sagawa | |
| 7,649,462 B2 | 1/2010 | Ellis et al. | |
| 7,876,220 B2 | 1/2011 | Aldridge | |

(Continued)

*Primary Examiner* — Ahshik Kim
(74) *Attorney, Agent, or Firm* — Dunlap Bennett & Ludwig, PLLC

(57) ABSTRACT

A method of tracking clothing repair requests in the uniform rental industry. The method embodies a matrix barcode at a distribution point for garments. The matrix barcode, when scanned, directs the scanning device to a route accounting software for collecting identifier and repair data pertaining to a garment in need of repair. The route accounting software prompts the device for (a) the identifier data in the form of a unique barcode number physically connected to the garment and (b) the repair data in the form of repairs types to be performed on the garment. The route accounting software associates each repair data type inputted with a service code, and then retrievable stores the identifier and repair data and associates such data with the barcode or RFID chip. As a result, downstream the barcode or RFID card is scanned to ascertain the repair types needed for the physically connected garment.

7 Claims, 1 Drawing Sheet

(56) References Cited

U.S. PATENT DOCUMENTS

| | | | |
|---|---|---|---|
| 9,616,466 B1 | 4/2017 | Bauer et al. | |
| 9,704,200 B2 | 7/2017 | Horst et al. | |
| 10,494,759 B1 | 12/2019 | Ponte et al. | |
| 10,504,170 B2* | 12/2019 | Hornbuckle | G06Q 30/0621 |
| 2006/0138918 A1 | 6/2006 | Parslow | |
| 2008/0156705 A1 | 7/2008 | Markman | |
| 2008/0249652 A1* | 10/2008 | Burr | G06Q 30/06 700/132 |
| 2012/0146784 A1 | 6/2012 | Hines et al. | |
| 2014/0310135 A1 | 10/2014 | Chodieva | |
| 2016/0275775 A1* | 9/2016 | Glasgow | G01N 33/0001 |
| 2017/0161710 A1 | 6/2017 | Su | |
| 2019/0272501 A1* | 9/2019 | Pauline | A41D 1/002 |

* cited by examiner

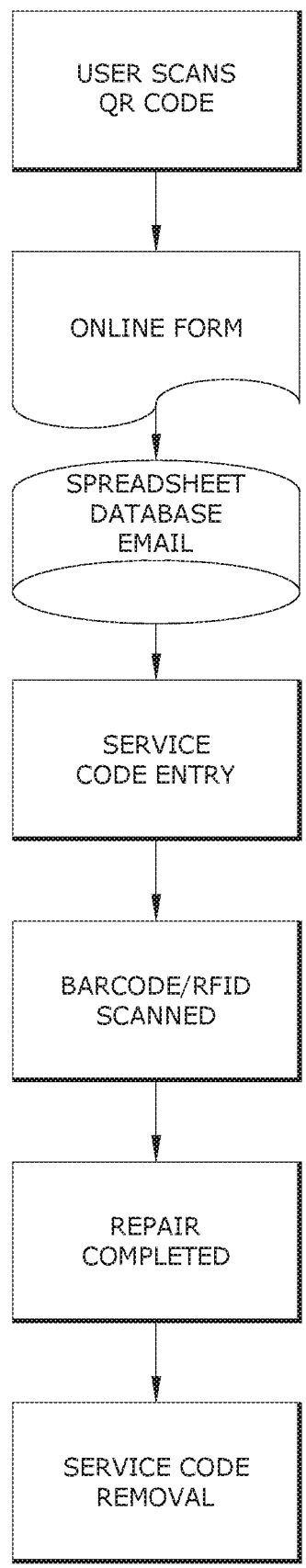

METHOD OF TRACKING REPAIR REQUESTS IN THE UNIFORM RENTAL INDUSTRY

CROSS-REFERENCE TO RELATED APPLICATION

This application claims the benefit of priority of U.S. provisional application No. 62/791,275, filed 11 Jan. 2019, the contents of which are herein incorporated by reference.

BACKGROUND OF THE INVENTION

The present invention relates to the uniform rental industry and, more particularly, to a method of tracking repair requests in the uniform rental industry that embodies a matrix barcode used for gathering repair and identifier data that is associated to a barcode or RFID chip that is physically connected to the garment in need of repair. As a result of the use of the present invention those who will provide the repairs, say workers in a remote uniform company's facility, need only scan the barcode or RFID chip to ascertain the needed repairs, solving the problem of repairs on clothing being missed in the uniform rental industry.

Current methods of tracking requested repairs to clothing in the uniform rental industry are inaccurate, time-consuming, and paper-reliant, resulting in the repairs on clothing being missed. Simply put, the paper method relies on articles (paper) that are not physically attached to the garment in need of repairs, and so can be lost in the repair process, keeping the associated garment from being repaired.

As can be seen, there is a need for a method of tracking repair requests in the uniform rental industry that embodies a front-end matrix barcode directed to a route accounting software for collecting identifier and repair data pertaining to a garment in need of repair, wherein the identifier data includes a unique barcode number from a barcode or RFID chip already attached to the garment in question. The route accounting software associates each repair data input with a service code, and then in turn associates that service code with the identifier data, which itself is associated with the barcode or RFID chip that is physically attached to the garment. The route accounting software may utilize an online form for prompting the user of the matrix barcode for the identifier data and repair data that is collected. Again, the barcode or RFID chip is physically connected to a garment that is sent to and from the uniform company's facility to a plurality of distribution locations. At the uniform company's facility, the garment's barcode or RFID chip is scanned and cannot be released from the facility until the service code is disassociated from the route accounting software, facilitating a 99.9% completion rate for all clothing repairs utilizing the disclosed method.

In certain embodiments, a customer will put up a QR code provided by the uniform company facility. When in need of a clothing repair the QR code is scanned by a phone. That scan prompts the user to a website. The user enters the barcode associated with the garment on the website. One then selects the type of repair they want done. This selection is synced to a service code. After they click submit, the barcode and service code are sent to an online form. A relational database management system automatically sends both the barcode and service code from our online form to our route accounting software. Once the information is in the route accounting software, the RFID chip or barcode will know to pull the garment for repair when the garment is scanned in the uniform facility.

SUMMARY OF THE INVENTION

In one aspect of the present invention, a method of tracking clothing repair requests for a garment in a uniform rental industry includes the following: providing one or more uniform article with a barcode or RFID card physically attached thereto, wherein the barcode or RFID card contains a barcode number; providing a matrix barcode having a unique location tracker; the matrix barcode is configured so that a user who scans the matrix barcode is directed to a route accounting software; the route accounting software is configured to prompt the user to enter identifier data comprising the barcode number and repair data comprising at least one repair type to be performed on the one or more uniform article; the route accounting software is configured to associate each repair type with a service code; and the route accounting software is configured to associate the identifier data and repair data so as to be retrievable through scanning the barcode or RFID card.

In another aspect of the present invention, the method of tracking clothing repair requests for a garment in a uniform rental industry includes the following: providing one or more uniform article with a barcode or RFID card physically attached thereto, wherein the barcode or RFID card contains a unique barcode number; providing a matrix barcode having a unique location tracker; the matrix barcode is configured so that a user who scans the matrix barcode is directed to a route accounting software; the route accounting software is configured to prompt the user through an online form to enter identifier data comprising the barcode number and repair data comprising at least one repair type to be performed on the one or more uniform article; the route accounting software is configured to associate each repair type with a service code; the route accounting software configured to associate the identifier data, repair data, and the unique location tracker by way of scanning the matrix barcode. so that the identifier data, repair data, and the unique location tracker is retrievable through scanning the barcode or RFID card; and removing the service code from the route accounting software only after the at least one repair type to be performed is performed and when the service code is disassociated from the route accounting software only after the at least one repair type to be performed is performed.

These and other features, aspects and advantages of the present invention will become better understood with reference to the following drawings, description and claims.

BRIEF DESCRIPTION OF THE DRAWINGS

The sole FIGURE is a schematic flowchart of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method of tracking clothing repair requests in the uniform rental industry. The method embodies a front-end matrix barcode that can be placed in any distribution point for garments. The matrix barcode, when scanned, is directed to a route accounting software for collecting identifier and repair data pertaining to a garment in need of repair. A user who scans the matrix barcode, is directed to the route accounting software and prompted by way of an online form to enter (a) the identifier data in the form of the a unique barcode number physically connected to the garment and (b) the repair data in the form of repairs types to be performed on the garment. The route accounting software associates each repair data type inputted with a service code, and they associate the identifier and repair data together so as to be retrievably stored, for those scanning the barcode or RFID chip downstream. As a result, downstream the barcode or RFID card is scanned to ascertain the repair types needed for the physically connected garment.

Referring to the sole FIGURE, the present invention may include at least one computer with a user interface. The computer may include at least one processing unit coupled to a form of memory. The computer may include, but not limited to, a microprocessor, a server, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The present invention includes a matrix barcode or two-dimensional barcode (colloquially known as a QR Code®) that is a machine-readable optical label that contains a unique identifier and points to a route accounting software. The matrix barcode can be applied to a sticker or other printable objects and is usually at a customer distribution location or used internally by a service company. For example, the matrix barcode can be a sticker on the wall of a uniform rental location, such as the locker room for the team, renting sports uniforms from a uniform company facility.

The matrix barcode is scanned by a user (handling the garment) via their smart phone or other mobile computing device. Scanning the matrix barcode points the computing device to the route accounting software which in turn prompts the user to complete an online form for gathering both repair and identifier data. The online form provides options for repair types and an area to enter the unique barcode number of the barcode or RFID chip that is physically attached to the garment. The route accounting software associates or pairs the repair and identifier data. In certain embodiments, the mobile computing device is adapted to input data into the online form.

In certain embodiments, the matrix barcode contains a unique location tracker associated with the physical location in which the matrix barcode is found, for example the locker room where it is stuck to the wall. The route accounting software may be loaded with the unique location tracker of the matrix barcode that directs the user to the route accounting software, thereby informing the system of the location of where the repaired garment needs to be returned to.

The resulting repair and identifier data are accessible to the route accounting software and exportable. Forms of exportation include but are not limited to email or spreadsheet. If submitted by email the associated identifier and repair data may be manually inputted into the route accounting software. Once the barcode number (identifier data) and repair types (repair data) are in the route accounting software, such data becomes retrievable by those scanning the barcode or RFID chip that is physically attached to the garment.

In the uniform company's facility, after the garment's connected barcode or RFID chip is scanned by a barcode scanner or RFID scanner, the garment is then repaired based on the associated repair data, based in part on the service code or codes associated with the repair types. Once the repair is complete and the service code is disassociated from the route accounting software, only then can the garment be returned to the customer.

A method of using the present invention would include the following. A user of garments may scan the matrix barcode at their uniform rental location. After the online form is available to view the person will enter the barcode number from the respective garment in need of repair and select the repair type or types. They will then submit the information so the repair can be done at the uniform company's facility. An employee at the uniform company's facility would then use the information provided by scanning the barcode or RFID chip to make the necessary repair. Once the repair is complete the service code is disassociated from the route accounting software. At the uniform company's facility, the garment cannot be released from the facility until the service code is so disassociated, facilitating a 99.9% completion for all clothing repairs utilizing the method of the present invention.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of tracking clothing repair requests for a garment in a uniform rental industry, comprising:
   providing one or more uniform article with a barcode or RFID card physically attached thereto, wherein the barcode or RFID card contains a barcode number;
   providing a matrix barcode having a unique location tracker;
   the matrix barcode is configured so that a user who scans the matrix barcode is directed to a route accounting software;
   the route accounting software is configured to prompt the user to enter identifier data comprising the barcode number and repair data comprising at least one repair type to be performed on the one or more uniform article;
   the route accounting software is configured to associate each repair type with a service code;
   the route accounting software is configured to associate the identifier data and repair data so as to be retrievable through scanning the barcode or RFID card; and
   removing the service code from the route accounting software only after the repair for the service code is performed.

2. The method of claim 1, wherein an online form is coupled to the route accounting software for prompting the user for the identifier data and the repair data.

3. The method of claim 1, further comprising associating the unique location tracker with the identifier data and the repair data by way of scanning the matrix barcode.

4. A method of tracking clothing repair requests for a garment in a uniform rental industry, comprising:
   providing one or more uniform article with a barcode or RFID card physically attached thereto, wherein the barcode or RFID card contains a unique barcode number;
   providing a matrix barcode having a unique location tracker;
   the matrix barcode is configured so that a user who scans the matrix barcode is directed to a route accounting software;
   the route accounting software is configured to prompt the user through an online form to enter identifier data comprising the barcode number and repair data comprising at least one repair type to be performed on the one or more uniform article;
   the route accounting software is configured to associate each repair type with a service code;
   the route accounting software configured to associate the identifier data, repair data, and the unique location tracker by way of scanning the matrix barcode, so that the identifier data, repair data, and the unique location tracker is retrievable through scanning the barcode or RFID card; and
   removing the service code from the route accounting software only after the repair for the service code is performed.

5. A method of tracking clothing repair requests for a garment in a uniform rental industry, comprising:
   providing one or more uniform article with a barcode or RFID card physically attached thereto, wherein the barcode or RFID card contains a barcode number;
   providing a matrix barcode having a unique location tracker;
   the matrix barcode is configured so that a user who scans the matrix barcode is directed to a route accounting software;
   the route accounting software is configured to prompt the user to enter identifier data comprising the barcode number and repair data comprising at least one repair type to be performed on the one or more uniform article;
   the route accounting software is configured to associate each repair type with a service code;
   the route accounting software is configured to associate the identifier data and repair data so as to be retrievable through scanning the barcode or RFID card; and
   disassociating the service code from the route accounting software only after the repair for the service code is performed.

6. The method of claim 5, wherein an online form is coupled to the route accounting software for prompting the user for the identifier data and the repair data.

7. The method of claim 5, further comprising associating the unique location tracker with the identifier data and the repair data by way of scanning the matrix barcode.

* * * * *